April 19, 1932. F. KARSTEN ET AL 1,855,057
AUTOMATIC AUTOMOBILE BRAKE
Filed Nov. 19, 1930
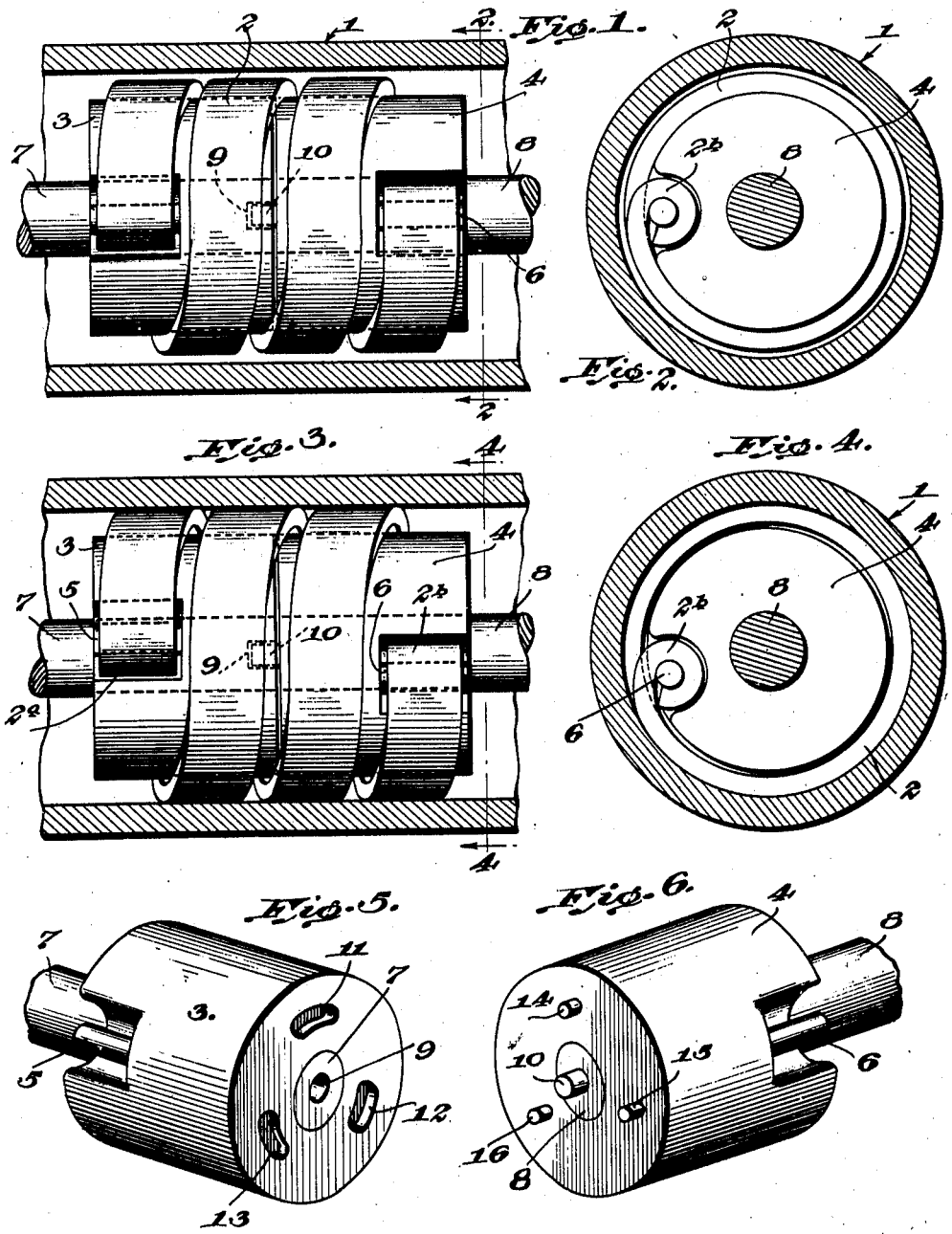
INVENTORS
David A. Runnion
Fred Karsten
BY
ATTORNEY Patented Apr. 19, 1932

1,855,057

UNITED STATES PATENT OFFICE

FRED KARSTEN AND DAVID A. RUNNION, OF HONOLULU, TERRITORY OF HAWAII

AUTOMATIC AUTOMOBILE BRAKE

Application filed November 19, 1930. Serial No. 496,718.

This invention relates to automatic brakes for automobiles.

A primary object of the invention is to provide a built in brake of this character located between the clutch and the transmission and forming a direct drive from the clutch to the transmission and which is so constructed as to absorb the momentum of the car and to provide for the accelerator's complete control of the speed of the car by virtue of its control of the engine which in turn controls the operation of the brake.

Another object of the invention is to so construct a brake of this character that it will operate like a scale being perfectly balanced, and in which no more pressure than is necessary is exerted on the brakes.

Another object is to construct an automobile brake so that the braking action will be automatically brought into effect when the power from the driving wheels exceeds that of the engine, or when the rotation of the transmission drive shaft exceeds that of the clutch drive shaft, and this braking action will continue until these shafts obtain the same rate of acceleration.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a longitudinal section partly in elevation of a brake constructed in accordance with this invention;

Fig. 2 is a transverse section taken on the line 2—2 of Fig. 1;

Fig. 3 is a view similar to Fig. 1 showing the brake shoe in operative position;

Fig. 4 is a transverse section taken on the line 4—4 of Fig. 3;

Fig. 5 is a detail perspective view of one of the drums constituting a part of the invention; and Fig. 6 is a similar view of the other drum.

In the embodiment illustrated, an outer cylindrical cast iron casing 1 is built into the car between the clutch and the transmission and constitutes a fixed stationary brake member. This casing has its inner surface machined to a smooth finish.

A heavy steel spring 2 spirally wound and machined is mounted within the casing 1 and constitutes the brake shoe. Disposed within the casing and extending in opposite directions are the transmission drive shaft 7 and the clutch drive shaft 8 which carry cylindrical drums 3 and 4, the former being mounted on and secured to the transmission shaft 7 and the latter to the clutch shaft 8. These two shafts 7 and 8 which extend through their respective drums are connected at their meeting ends by a bearing comprisng a socket 9 formed in the end of shaft 7 and a longitudinally extending stud or tip 10 which is adapted to fit within the socket 9 and this bearing operates to retain the shafts 7 and 8 in alined relation. The inner or meeting end of the drum 3 is provided with a plurality of arcuate slots 11, 12 and 13 to receive projecting pins 14, 15, and 16 carried by the opposed face of drum 4. This connection by means of the pins or pins and slots permits sufficient motion to the two drums to operate the spiral brake shoe. However, should the brake shoe break, then the slots and the pins will limit the independert motion of the drums 3 and 4, but will not limit the action of the shoe. It will thus be seen that these tips or pins and slots come into action only in case of a break of the spiral shoe and without them the clutch drive shaft would be free of the transmission drive shaft in case the shoe were to break. The spiral brake shoe 2 is wound to a smaller diameter than the drums 3 and 4 so that when the brake shoe is placed in position it will have sufficient tension to drive the disengaged clutch.

The drums 3 and 4 are provided in their outer ends with recesses formed therein for anchor bolts 5 and 6 with which are engaged eyes 2a and 2b formed at the ends of the spiral brake shoe as is shown clearly in Figs. 1, 3 and 4.

When the engine of a car equipped with this brake begins to deliver power through the clutch shaft 8, the brake shoe 2 will drive the transmission drive shaft 7 in the same direction transmitting power from the shaft 7 through the transmission to the main drive shaft, not shown. This action takes place while the engine is pulling, but when the car is going down hill or when the engine is slowed up for any reason the power stored up in the mass of the car or the power delivered through the wheels due to going down hill will immediately be absorbed by the action of the brake shoe 2 which will expand against the inner face of the cylinder 1 when the power of the rear wheel is greater than the engine power or when the shaft 7 gains over shaft 8. This braking action will continue until the two shafts 7 and 8 have obtained the same rate of acceleration when the shoe 2 will again retract into the position shown in Fig. 1 and no braking action will be produced.

It is to be understood that the cylinder 1 is closed fluid tight at its ends, suitable bushings (not shown) being used in connection with the shafts 7 and 8, so that this casing may contain oil in which the drums 3 and 4 and the brake shoe 2 will run.

It is to be observed that a comparatively small clearance is provided between the inner face of the casing 1 and the spiral brake shoe 2 when the parts are in normal inoperative position as is shown clearly in Figs. 1 and 2.

It will be seen that this brake constitutes a built-in feature of the car and is located between the clutch and the transmission, being formed of a two-piece shaft carrying two duplicate drums which are tied together by the brake shoe and thus form a direct drive between the clutch and the transmission. The duplicate drums 3 and 4 with the brake shoe 2 are free to revolve inside the stationary drum 1 which is mounted on the driven end of the transmission not shown. Normally the momentum of the car tends to keep up the speed of the engine even when the throttle is closed and it is to absorb this momentum that this automatic brake was designed. Thus the accelerator completely controls the speed of the car by virtue of its control of the engine which in turn controls the operation of the brake.

It is to be understood that the construction herein shown constitutes one form only of applicants' invention.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

We claim:

1. The combination with clutch and transmission drive shafts, a casing in which said shafts are located, a connection between said shafts to permit them to rotate individually and yet be held in alinement, drums fixed to said shafts, a spiral spring encircling said drums and connected at its ends to the respective drums and adapted to brakingly engage the casing when the speed of one shaft exceeds that of the other to absorb the momentum of said shaft and reduce its speed to the same speed as the other shaft, and a pin and slot connection between said drums to allow sufficient motion of the drums to operate the spiral brake shoe and to limit the independent motion of the drums in case of breakage of the shoe without limiting the action on the shoe.

2. The combination with clutch and transmission drive shafts, a casing in which said shafts are located, a spiral brake shoe connecting said shafts and expansible to engage said casing when the speed of one shaft exceeds that of the other, and safety means between said shafts operable in case of breakage of the spiral shoe to retain the shaft in operative relation without limiting the action of the shoe.

FRED KARSTEN.
DAVID A. RUNNION.